July 9, 1940.  M. C. CHANEY  2,207,087
FARMING IMPLEMENT
Filed Jan. 16, 1939  2 Sheets-Sheet 1
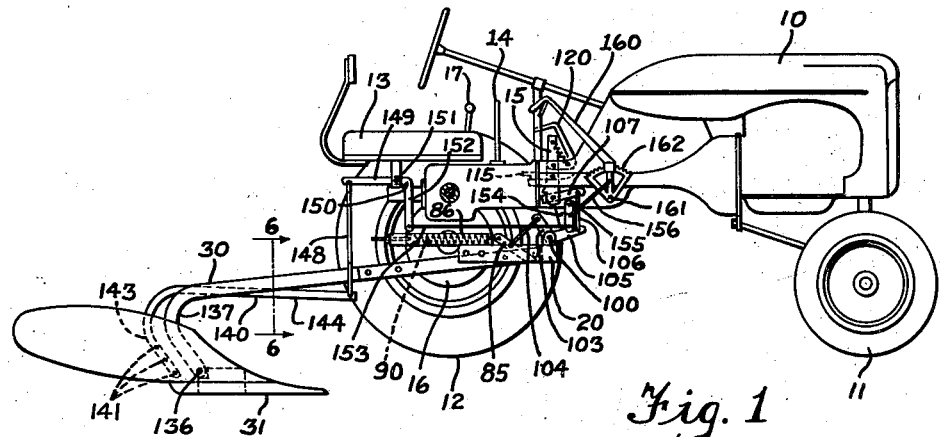
Fig. 1
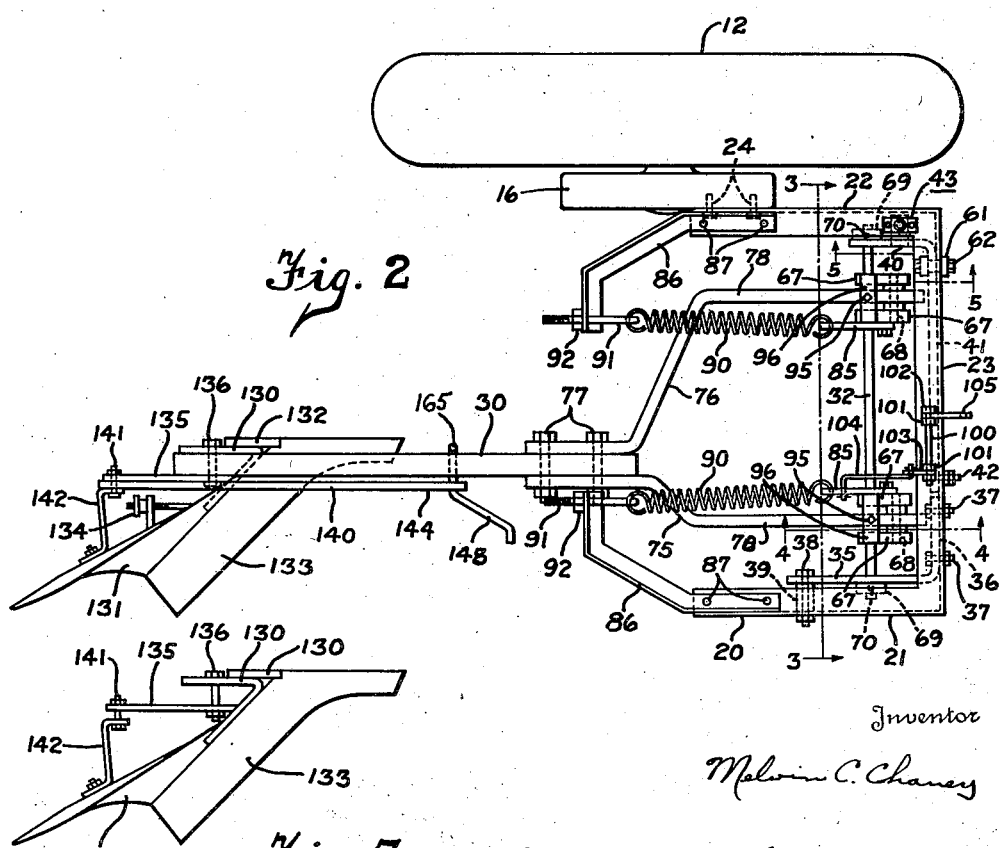
Fig. 2
Fig. 7
Inventor
Melvin C. Chaney
By
Marechal & Noe
Attorneys July 9, 1940.  M. C. CHANEY  2,207,087
FARMING IMPLEMENT
Filed Jan. 16, 1939  2 Sheets-Sheet 2
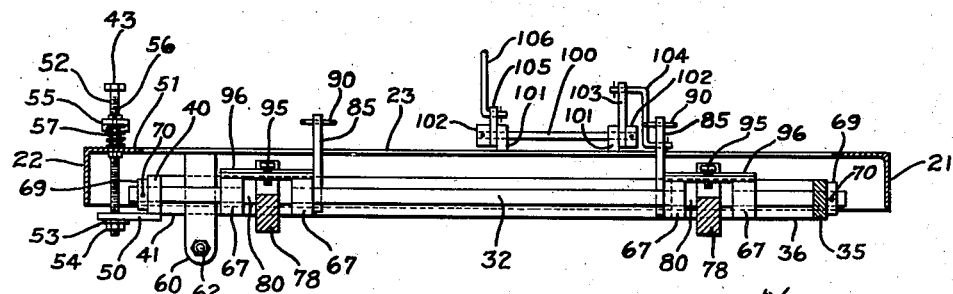
Fig. 3
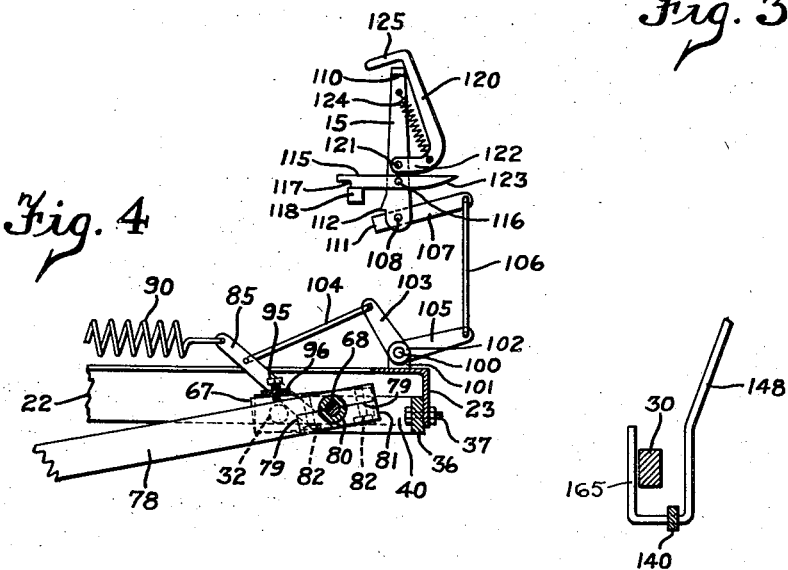
Fig. 4
Fig. 6
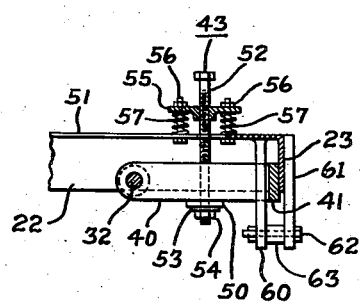
Fig. 5
Inventor
Melvin C. Chaney
By Maréchal & Hoe
Attorneys Patented July 9, 1940

2,207,087

UNITED STATES PATENT OFFICE 2,207,087

FARMING IMPLEMENT

Melvin C. Chaney, Springfield, Ohio, assignor of one-half to William E. Chaney, Springfield, Ohio Application January 16, 1939, Serial No. 251,102

17 Claims. (Cl. 97—47)

This invention relates to a farming implement and more particularly to a tractor apparatus in which an implement attachment assembly is adapted to be mounted directly on the tractor for operation as a unitary power driven implement.

It is a principal object of the invention to provide a power driven farming implement, adapted for varying uses, which is simple and inexpensive to manufacture and repair, which has ease and readiness of control and maneuverability, and which is protected against damage arising from obstacles encountered in use.

It is a further object to provide a farming implement of this character in which the power drive is disengaged upon the implement striking a heavy obstacle to avoid damage, the tractor being arranged to thereupon automatically move to such position as to facilitate freeing the implement from the obstacle.

It is a further object of the invention to provide a farming implement of this character in which the implement such as a plow can be readily adjusted to operate at a desired depth below the surface of the ground and will automatically maintain itself at the adjusted depth irrespective of changes in the contour or hardness of the ground.

It is a further object to provide such implement in which a plow having both a lifting and an angular swinging movement is automatically lifted upon striking an obstacle and simultaneously adjusted to an angular position tending to free the plow, the angular position being such as to facilitate reentry of the plow into the ground after passage over the obstacle.

It is a still further object to provide such implement in which a common control is provided for effecting angular swinging adjustment of the plow upon a support to control its entry into the ground and the depth at which it operates and to effect the lifting of the plow to withdraw it from operative position.

Other objects and advantages of the invention will be apparent from the following description, the appended claims, and the accompanying drawings, in which:

Fig. 1 is an elevational view, partly broken away, of a tractor having an implement attachment constructed in accordance with the invention assembled thereon in operative relationship;

Fig. 2 is a top plan view of the attachment assembly and shows the positioning of the assembly with respect to a rear wheel of the tractor;

Fig. 3 is a vertical sectional view taken along the line 3—3 of Fig. 2;

Fig. 4 is a fragmentary, sectional view taken along the line 4—4 of Fig. 2 and showing the clutch operating mechanism in detail;

Fig. 5 is a fragmentary, sectional view taken along the line 5—5 of Fig. 2 and showing a detail of the supporting structure for the attachment assembly;

Fig. 6 is a fragmentary, sectional detail view taken along the line 6—6 of Fig. 1; and Fig. 7 is a detail view of the implement carried by the attachment device of Fig. 1.

In accordance with the present invention the implement is supported on the tractor by means of an attachment assembly that can be readily attached to or detached from a conventional tractor and which provides for automatically disengaging the tractor clutch when the implement strikes an obstacle that might cause damage to the implement, the clutch operating mechanism being thereafter automatically returned to a normal operative position and the tractor being automatically moved to a position that facilitates the freeing of the implement from the obstacle. The invention has particular importance in mounting a plow on a power driven tractor and provides for protecting the plow against damage and for controlling the operation of the plow in an improved and highly effective manner.

Referring to the drawings which illustrate a preferred embodiment of the invention the implement attachment assembly is shown as applied to a "farm-all" or high suspended rear axle type of tractor. The tractor, which is designated generally by the reference numeral 10, is provided with the usual front steering wheels 11, rear traction wheels 12, operator's seat 13, gear lever 14 and foot-actuated clutch pedal 15. The rear wheels 12 are supported at each side of the tractor by means of castings 16 which extend downwardly from the tractor chassis and house suitable gearing for driving the wheels. To provide for turning the tractor about a very short radius a separate hand brake 17 is also provided for each of the rear wheels.

The attachment assembly is carried by a substantially U-shaped frame member 20 which as shown in Figs. 2 and 3 is constructed from angle irons and has side arms 21 and 22 and a cross portion 23. The frame member 20 is mounted between the rear wheels of the tractor and extends forward to about on line with the front ends of the rear wheels. Bolts 24 which extend through the side arms 21 and 22 and thread into the gear housing 16 rigidly attach the frame 20 to the tractor.

An implement supporting beam 30 extends rearwardly of the frame member 20 and supports an implement such as the plow 31 at the rear of the tractor. The forward end of the beam 30 is mounted on the frame member by means of a crankshaft 32 which is rotatably supported on the frame member 20 and extends transversely of the tractor when the frame member is assembled thereon. The support for the crankshaft is such that it may be adjustably tilted in a vertical plane to provide for adjusting the angularity of the implement carried by the beam 30 to compensate for tilt of the tractor when one of the rear wheels travels at a higher level than the other, such, for example, as in a plowing operation where one of the wheels travels in a furrow while the other wheel travels on solid, unplowed ground.

As shown in Figs. 2 and 3 one end of the crankshaft 32 takes its bearing in the rearwardly extending arm 35 of an angle bar 36. The arm 35 is spaced from the side frame member 21 and is fixedly supported on the frame by means of bolts 37 and 38 and spacing collar 39. The other end of the crankshaft takes its bearing in the rearwardly extending arm 40 of a second angle bar 41 which is pivotally mounted on the frame portion 23 as indicated at 42 and is supported adjacent the arm 40 by means of an adjusting mechanism indicated generally by the reference numeral 43 and best shown in Figs. 3 and 5.

Referring to these figures a plate 50 is welded or otherwise attached to the arm portion 40 of the angle bar 41 and extends laterally of the arm into underlying relationship with the top 51 of the angle iron forming the side member 22 of the frame 20. An adjusting screw 52 extends downwardly through suitable openings provided in the frame portion 51 and the plate 50 and is rotatably connected to the under side of the plate by means of a washer 53 and nut 54. An adjusting nut 55 is threadedly engaged with the adjusting screw 52 above the angle iron portion 51 and is maintained against rotation by bolts 56 which extend through the frame member and the nut. A rockable support for the adjusting screw assembly is provided by coil springs 57 which surround the bolts 56 and are compressed between the nut 55 and the top portion 51 of the frame member. It will be evident from the foregoing description that when the screw 52 is rotated in the nut 55 the arm 40 will be lowered or raised to cause the crankshaft 32 to swing in a vertical plane about its bearing in the fixed arm 35. The bearings in the arms 35 and 40 are of sufficient size to provide for the vertical swinging movement of the crankshaft.

The pull on the beam 30 which is transmitted to the arm 40 by the crankshaft 32 is resisted by a pair of guide plates 60 and 61 that are welded or otherwise rigidly attached to the frame portion 23 adjacent the arm 40 and extend downwardly on opposite sides of the transversely extending portion of the angle bar 41. The guide plates have sufficient length to provide for the full vertical adjustment of the angle bar 41 and are connected together at the lower end by means of bolt 62 and spacing collar 63 to provide for transmitting the pull on the arm 40 to both plates.

The crankshaft 32 is illustrated as being of the built-up type and is provided with two pairs of crank arms 67 which are positioned adjacent the ends of the crankshaft and carry crank pins 68. The various parts of the crankshaft are welded or otherwise rigidly attached to each other to provide a rigid, unitary structure. The crankshaft is supported in the arms 35 and 40 by means of collars 69 and set screws 70 which provide for adjusting the position of the crank arms 67 transversely of the tractor.

The beam 30 is operatively connected to the crankshaft 32 by means of yoke members 75 and 76 which are rigidly attached to the beam adjacent the forward end thereof as indicated at 77. The yoke members 75 and 76 extend forwardly and outwardly from the beam, as shown, and are provided with parallel, forwardly extending portions 78 which are pivotally mounted on the crank pins 68. As shown in Fig. 4 the forward ends of the arms 78 are provided with a cut-away portion 79 adapted to receive a split bushing 80 that is adapted to fit around the crank pin 68 and provide a bearing for the yoke arm. The bushing 80 is rigidly clamped in the arm portion 78 by means of a cap 81 and bolts 82 and extends laterally of the arms into engagement with the crank arms 67 to provide for centering the yoke arms between the crank arms. Since the respective pairs of crank arms 67 are positioned adjacent the ends of the crankshaft the portions 78 of the yoke arms 75 and 76 are spaced relatively far apart and provide for rigidly supporting the beam 30 against any tendency to turn about its longitudinal axis.

An arm 85 is rigidly attached to each of the pairs of crank arms 67 and in the normal position of the crank arms, which is the position illustrated in which the crank arms extend forwardly of the crankshaft, the arms 85 extend upwardly and rearwardly of the crankshaft. A pair of angle brackets 86 are rigidly attached to the frame members 21 and 22 as indicated at 87 and extend rearwardly and inwardly of the frame member as shown. A coil spring 90 is tensioned between each of the arms 85 and a cooperating bracket 86 and provides a torque tending to rotate the crankshaft 32 in a counterclockwise direction as viewed in the drawings. The springs 90 thus provide a torque which opposes the tendency of the crankshaft to rotate in a clockwise direction under the torque applied to the shaft by a pull or drag on the beam 30. The springs are attached to the angle brackets 86 by means of eye-bolts 91 and nuts 92 which provide for adjusting the tension on the springs.

Upward movement of the crank arms in response to the torque applied to the crankshaft by the springs 90 is limited by set screws 95, Figs. 2, 3 and 4, which thread through plates 96 welded or otherwise rigidly attached to the tops of the crank arms 67 and bear against the tops of the portions 78 of yoke arms 75 and 76. The set screws thus provide for adjusting the normal forward position of the crank arms and the beam 30 supported thereon. The springs 90 are of a relatively strong, heavy construction and are tensioned by the adjusting bolts 91 to provide a normal pull on the arms 85 that is sufficient to resist any normal pull on the beam 30. The crank arms are thus maintained in the normal forward position with the yoke members engaged against the set screws 95 during all normal operations of the attachment assembly. When an abnormal pull is applied to the beam, however, such as when the plow or other implement strikes a large root, rock or other impassable obstruction while the tractor is moving forward, the pull on the beam is sufficient to overcome the pull of the springs and the crank arms are rotated through an angle of approximately 180° to a position in which they extend rearwardly of the crankshaft. The adjustment of the set screws 95 is preferably such that when the yoke members engage against the screws the crank arms will extend somewhat above the horizontal plane of the crankshaft as indicated in Fig. 4 to support the beam 30 relatively close to its dead center position relative to the crankshaft. The component of force tending to rotate the crankshaft in response to a pull on the beam 30 is thus reduced to a very small proportion of the total pull on the beam and the size and strength of the springs 90 can be correspondingly decreased.

The rotational movement of the crankshaft in response to an abnormal drag on the beam 30 is utilized to lock the clutch in a disengaged position and effect stoppage of the tractor before there is any danger of breaking the implement carried by the beam. This rotational movement also provides for relative longitudinal movement between the tractor and implement during the time that the clutch disengaging means is operating. The arrangement is such that after the clutch pedal has been locked in the disengaged position the various parts of the attachment assembly including the clutch disengaging means are automatically returned to the normal position without the necessity of any adjustments or special operations on the part of the operator.

Referring to Figs. 1 through 4 a shaft 100 is rotatably supported on top of frame member 23 by means of lugs 101 and retaining collars 102. An arm 103 is attached to one end of the shaft and normally extends upwardly and rearwardly of the shaft. A link 104 operatively connects the arm 103 to one of the arms 85 carried by the crank arms 67. An arm 105 is attached to the other end of the shaft 100 and normally extends forwardly of the shaft at a small angle above the horizontal. A link 106 operatively connects the arm 105 with a lever 107 that is pivotally mounted on the shaft 108 which supports the clutch pedal 15.

The clutch pedal 15 is provided with a laterally extending, foot-engaging portion 110 and is pivotally mounted on the tractor adjacent its lower end by means of the shaft 108. Suitable means (not shown) are provided for disengaging the tractor clutch when the clutch pedal 15 is depressed and for returning the clutch pedal to the normal position illustrated in Figs. 1 and 4 in which the clutch is engaged when the pedal is released. The lever 107 is freely mounted on the shaft 108 and is provided with an extension 111 that is adapted to engage a lug 112 provided on the clutch pedal 15 and rotate the pedal to a clutch-disengaging position when the link 106 is depressed by arm 105. Rotational movement of the crankshaft 32 and the crank arms 67 in response to an abnormal pull on the beam 30 causes the arms 85 to move to a position forwardly of the crankshaft. This movement of the arms 85 is transmitted to the arm 103 by the link 104 and causes the shaft 100 to rotate to depress the link 106. The clutch pedal 15 is thus automatically moved to disengage the clutch in response to the abnormal pull on the implement supporting beam.

A means is provided for locking the clutch in the disengaged position to permit the tractor to be moved under the influence of the springs 90 to a position facilitating the freeing of the implement from the obstacle and providing for the automatic return of the clutch disengaging mechanism to its normal operative position. As shown a locking lever 115 is pivotally mounted on the clutch pedal 15 above the lever 107 as indicated at 116 and is provided with a notched shoulder 117 which is adapted to drop into locking engagement with a fixedly mounted lug 118 when the clutch pedal is moved to a clutch-disengaging position by the lever 107. With the clutch thus locked the actuating lever 107 is free to return to its normal position shown in Figs. 1 and 4 and the tractor is free to move in a backward direction. The strength of springs 90 is such that as soon as the forward motion of the tractor has been arrested by the pull on the beam 30 and while the clutch is still locked in the disengaged position the springs will pull the tractor backwards to permit the crank arms to be rotated under the influence of the springs to their normal forward position in which the yoke arms 75 and 76 extend forwardly of the crankshaft and engage against the adjusting screws 95. The beam 30 and the various parts of the clutch releasing mechanism are thus automatically restored to their normal operative position on the tractor, and the tractor is moved to a position providing for the ready freeing of the implement from the obstacle.

An auxiliary foot actuated lever 120 is pivotally mounted on the clutch pedal 15 above the locking lever 115 as indicated at 121 and provides for disengaging the locking lever from the lug 118 after the clutch releasing mechanism has been restored to its normal operative position by the springs 90. This lever also provides for maintaining the locking lever 115 in a raised position in which it does not engage the lug 118 during normal foot operation of the clutch pedal. As shown in Figs. 1 and 4, the lever 120 is provided with a lower, forwardly-extending portion 122 that overlies a forwardly extending portion 123 of the locking lever and is adapted to engage the portion 123 and swing the locking lever to an inoperative position relative to the locking lug 118 when the auxiliary lever is depressed. A spring 124 normally holds the auxiliary lever 120 in a raised position providing for free movement of the lever 115 into locking engagement with the lug 118 when the clutch pedal is actuated by lever 107. The upper end of the auxiliary lever 120 is provided with a rearwardly extending portion 125 that overlies the foot-engaging portion 110 of the clutch pedal and is adapted to be depressed to depress the lever when the foot of the operator is placed in operative engagement on the clutch pedal. Thus in the normal foot operation of the clutch pedal the lever 120 is depressed by the operator's foot and maintains the locking lever 115 in a raised, non-locking position relative to the lug 118. When it is desired to release the clutch pedal following its automatic operation by the lever 107 it is only necessary for the operator to press down on the clutch pedal with his foot, this operation serving to depress the lever 120 and swing the locking lever 115 out of locking engagement with the lug 118. The clutch pedal may be then returned to its normal engaged position in the usual manner.

As mentioned above the attachment assembly is shown as supporting a plow 31 and the present invention is of particular importance when the implement carried by the tractor is a plow. In the operation of a plow it frequently occurs that the toe of the plow runs into relatively heavy rocks, roots, stumps and the like which are likely to cause breakage or damage to the plow, particularly in the case of a power driven implement, and the mechanism hereinabove described provides for protecting the plow against such injury. In addition the invention provides for automatically raising the heel of the plow upon striking an obstacle and for simultaneously tilting the plow to an angular position which tends to further protect the plow against injury and facilitates the freeing of the plow from the obstacle and its passage thereover. This angular positioning is such that the plow immediately re-enters the ground upon passing over the obstacle or, in the case where the obstacle is impassable, the toe does not wedge itself into engagement with the obstacle, thus further facilitating the freeing of the plow from the obstacle. Further the invention provides for controlling the operation of the plow in a simple and effective manner to cause even a relatively light plow to very quickly dig itself into or out of the ground, to provide for adjusting the depth of furrow dug, and to effect raising of the plow to an inoperative position above the ground.

In order to secure such operating results and control, the plow is pivotally mounted on the supporting beam 30 for free angular swinging movement about the axis of the pivot and its operation is controlled by a separate auxiliary beam operatively connected to an adjustable control means mounted on the frame of the tractor. As shown in Figs. 2 and 7, the plow 31 is provided with the usual frog or throat 130, mouldboard 131, landside 132, and plowshare 133 removably attached to the throat by the clamping mechanism 134. A reinforcing plate 135 is welded to the throat and extends rearwardly in spaced parallel relation to the landside side of the throat. A bolt 136 extends between the plate 135 and the landside side of the throat and provides for pivotally mounting the plow on the rear goose-neck portion 137 of the main beam 30. The plow is thus mounted on the beam 30 for free angular swinging movement about the axis of the pivot 136 but is rigidly supported against any tendency to turn laterally or about the longitudinal axis of the supporting beam. Since the spaced-apart yoke arms 75 and 76 likewise support the beam 30 against any tendency towards turning laterally or about its longitudinal axis and since the beam is of relatively short length the plow will always travel in straight line relative to the tractor. It is thus possible to plow a narrow ridge such as frequently occurs in the center of a plowed field without any tendency for the plow to work its way to one or the other side of the ridge.

The auxiliary beam 140 is rigidly attached to the plow by means of bolts 141 which extend between the plate 135 and the usual brackets 142 provided on the mouldboard, and is shown as having a gooseneck 143 and a forwardly extending portion 144. The auxiliary beam is attached to the plow in rear of the pivotal connection with the main beam as shown, and the portion 144 extends along one side of the main beam with its end in advance of the toe of the plow and positioned below the main beam when the plow is operating or resting level on the ground. A rigid, vertically extending link 148 is pivotally connected to the auxiliary beam 140 and operatively connects the forward end of the portion 144 of the auxiliary beam with the rearwardly extending arm 149 of a bell crank lever 150 that is pivotally mounted on the tractor frame as indicated at 151. The other arm 152 of the bell crank 150 extends downwardly as shown and a link 153 operatively connects the lower end of the arm with the lower end of an arm 154 that is pivotally mounted to the tractor frame adjacent the upper end of the arm as indicated at 155. A link 156 operatively connects the arm 154 with a pinch lever 160 that is pivotally mounted on the tractor as indicated at 161 and is provided with a suitable detent means adapted to releasably engage with the teeth of a segmental rack 162 to lock the pinch lever in a desired adjusted position.

As shown the pivotal connection between the link 148 and the arm portion 144 of auxiliary beam 140 lies intermediate the pivot axis 32 of the main beam and the pivot axis 136 of the plow and is so positioned that the turning radius of the auxiliary beam about its pivotal axis is much less than the turning radius of the main beam about its pivotal axis. Thus upon angular swinging movement of the plow about its pivot 136 under control of the auxiliary beam 140 the plow will turn rather sharply through a relatively large angle as compared to the angle through which the main beam swings about its pivot at the crank shaft 32.

It will be evident from the foregoing description that when the pinch lever 160 is moved towards the rear of the tractor the pivotally mounted arms 152 and 154 will move rearwardly to raise the forward end of the auxiliary beam 140 to cause the plow to swing about its pivotal mounting on the main beam 30 and tilt the toe of the plow upwardly. Similarly when the pinch lever is moved forwardly with respect to the tractor the linkage mechanism will cause the forward end of the auxiliary beam 140 to move downwardly and swing the plow to an angular position in which the toe points downwardly. The plow may thus be angularly tilted either upwardly or downwardly and the degree of tilt in either direction may be readily adjusted by moving the lever 160 to any desired position on the rack 162. The limit through which the plow may be tilted in a downward direction is such that the plow will dig itself in to the maximum depth of furrow which the plow is designed to cut. The spacing between the forward end of the auxiliary beam 140 and the main beam 30 is such that the plow can be tilted upwardly to an angle that is sufficient to cause the plow to work itself rapidly out of the ground.

The arrangement of the link 148 and pinch lever 160 is such that the plow may be raised to an inoperative clearance position above the ground. As shown in Fig. 6, the lower end of the link 148 which is connected to the auxiliary beam 140 is provided with a hook-shaped extension 165 that is adapted to engage under the main beam 30 and raise the main beam to a position in which the plow is supported a substantial distance above the ground. The angular travel of the pinch lever 160 is such that when the link 148 has been raised to a position in which it just engages the bottom of beam 30 and the nose of the plow has been tilted upwardly to cause the plow to work itself out of the ground as described above, the lever 160 will have moved through only a portion of its maximum travel in the rearward direction. Thus after the plow has worked itself to the top of the ground the pinch lever may be pulled backwards to its extreme limit of travel and will cause the link 148 to move still further upwardly to raise the beam 30 and the plow to a clearance position above the ground.

The operation of the implement is as follows. During travel of the tractor from one location to another the plow is maintained in its clearance position above the ground by means of lever 160 and control link 148. When it is desired to begin a plowing operation the operator moves the adjusting lever 160 forward to a position in which the plow rests on the ground and its toe is tilted downwardly. As the tractor moves forward the downward inclination of the toe causes the plow to dig very rapidly into the ground. This inclination also determines the depth at which the plow will operate. As the plow digs downwardly into the ground the end of the main beam 30 that is attached to the plow is lowered about its pivot on the tractor and causes the plow to level off and travel at a predetermined depth depending on the angular adjustment of the plow. The angular adjustment of the plow thus determines the depth at which the plow operates and this adjustment is readily controlled by the adjusting lever 160. The detent means releasably locks the lever 160 in its adjusted position and the plow normally continues to operate at the depth for which the lever is set. Since the vertical positioning of the forward end of auxiliary beam 140 is fixed relative to the tractor frame by control lever 160 the toe of the plow is automatically tilted upward when the rear wheels of the tractor pass over a rise in the ground and is tilted downwardly when the wheels fall into a depression, the degree of tilt being proportional to the rise or fall of the ground. The plow is thus automatically maintained at a substantially even depth below the surface of the ground although the ground itself may be very uneven. Should the plow run into relatively hard ground the drag on the plow tends to turn its toe downward about the pivotal axis on the main beam and there is, accordingly, no tendency for the plow to work its way out of the hard ground.

Should it be desired to cause the plow to operate at a greater or lesser depth it is only necessary to change the adjustment of the lever 160 relative to the segmental rack 162, the plow then automatically adjusting itself and levelling off at the new level. When it is desired to terminate the plowing operation the control lever 160 is pulled backward to a position in which the toe of the plow is tilted upwardly. This causes the plow to dig or lift itself out of the ground while the tractor travels only a relatively short distance forward. After the plow has dug its way to the surface it may be readily lifted to its inoperative position above the ground by pulling the lever 160 to its extreme position of rearward travel. During raising and lowering of the beam 30 and during the digging of the plow into and out of the ground the beam 30 and crank arms 67 pivot about the axis of the crankshaft 32 and the yoke members 75 and 76 are maintained in engagement with the set screws 95 by the springs 90.

If during a plowing operation the plow encounters some obstacle such as a relatively large rock, root, or the like the initial engagement of the plow with the obstacle causes the plow to tend to pivot about its toe as an axis, and since the forward end of the auxiliary beam 140 is locked in its adjusted vertical positioning this tendency causes the heel of the plow and the beam 30 to move upwardly. As the beam moves upwardly the plow simultaneously swings about its pivot 136 and the toe of the plow is caused to automatically tilt downwardly in accordance with the upward movement of the beam. The movement of the plow is thus such as to tend to throw the plow upwardly and free of the obstacle, and the plow is automatically tilted to an angular position which facilitates passage of the plow over the obstacle and tends to protect the plow against injury. When the plow has passed over the obstacle the downward tilt of the toe causes the plow to immediately reenter the ground and since the auxiliary beam is still locked in its adjusted position the plow levels off at the desired depth of cut without the necessity for any adjustments whatsoever on the part of the operator. Since the only weight supported by the beam 30 is the plow itself the plow and beam normally are readily thrown clear of even a relatively large obstacle upon engagement of the plow with the obstacle.

Should the obstacle be such that the plow cannot pass thereover when it is thrown upwardly and tilted in the manner described, the excessive pull on the plow and beam 30 will overcome the action of the springs 90 and cause the crank arms 67 to rotate to a position in rear of the crankshaft. This rotation of the crank arms and crankshaft causes the clutch to be automatically locked in a disengaged position as hereinabove described. This operation takes place before there is any danger of damaging the plow or other parts of the tractor assembly, the construction described providing for the immediate stopping of the plow with a limited continuation of forward motion of the tractor. As soon as the forward momentum of the tractor has been absorbed by the springs 90 and the tractor has stopped with its clutch locked in the disengaged position the springs act to return the tractor to a position which facilitates the freeing of the plow from the obstacle and permits the springs to automatically reset the clutch releasing mechanism to its normal operative position. The relative longitudinal movement between the beam 30 and the tractor in response to an excessive or abnormal pull on the plow causes the plow to rotate about its pivot in a direction that tends to still further free the plow from the obstacle and protect it against injury.

The automatic tilting of the plow and the rearward movement of the tractor under the action of the springs 90 normally frees the plow sufficiently to permit its being lifted clear of the obstruction by merely pulling backward on the lever 160. The forward travel of the tractor can then be continued by pressing down on the clutch pedal to release the lock 115 and releasing the clutch pedal in the usual manner. After the obstacle is passed the lever 160 is moved forward to again lower the plow to the ground and cause it to dig in to the desired depth. Should the plow have wedged itself into the obstacle, however, it can be readily freed by pressing down on the clutch pedal to release the lock and backing the tractor under its own power to move the plow away from the obstacle.

There is thus provided a unitary power driven implement that is strong and inexpensive in construction, that provides for protecting the implement in use, and which is readily maneuvered and controlled at all times by a single operator seated on the tractor and through the use of a simple control mechanism. The tractor as thus equipped is particularly adapted for small farm and garden work and will cultivate very close to the corners of a field or the like. The adjustable mounting for the implement carrying crankshaft adapts the implement for use on all kinds of ground and for various purposes.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a farming implement of the character described, a power driven vehicle, a plow support pivotally mounted on said vehicle, a plow pivotally mounted on said support, means attached to said plow and adjustably mounted upon a fixed portion of said vehicle for controlling the angular relation of the plow with respect to said plow support and for causing the plow upon engaging an obstacle to automatically tilt in a direction tending to free the plow from the obstacle, and means responsive to an abnormal pull on said plow for rendering the power means of the vehicle inoperative.

2. In a farming implement of the character described, a power driven vehicle, an implement adapted to be operated by said vehicle, a support for said implement, yieldable drive means for connecting said implement support to said vehicle including a rotatable shaft, means providing for limited relative movement of said implement support with respect to said vehicle upon rotation of said shaft, means effective at a predetermined angular position of said shaft for providing a direct non-yielding drive for said implement support, resilient means for normally maintaining said shaft in said predetermined non-yielding drive position under normal load conditions and providing for rotation of said shaft under yielding action of said resilient means to effect relative movement of the vehicle forwardly of said implement in response to an abnormal load condition, means for disengaging the power drive means of said vehicle in response to yielding movement of said yieldable drive, and means for retaining the power drive means in inoperative condition to provide for restoring the yieldable drive to normal direct driving relation.

3. In a farming implement of the character described, a power driven vehicle, an implement adapted to be operated by said vehicle, a support for said implement, yieldable drive means for connecting said implement support to said vehicle including a pair of angularly related arms rotatably mounted on said vehicle, means for pivotally connecting said implement support to one of said arms, means effective at a predetermined angular position of said arms for providing a direct non-yielding drive for said implement support, means including a resilient link connected to the other of said arms for normally maintaining said arms in said predetermined non-yielding drive position under normal load conditions and providing for rotation of said arms under yielding action of said resilient link to effect limited relative movement of the vehicle forwardly of said implement in response to an abnormal load condition, means for disengaging the clutch of said vehicle in response to yielding movement of said yielding drive means, and means for locking said clutch in disengaged position, said resilient link upon the locking of said clutch in disengaged position providing for returning said vehicle with respect to said implement to thereby automatically restore said yieldable drive means to normal direct driving relation.

4. In a farming implement of the character described, a power driven vehicle, a beam adapted to mount a plow on said vehicle, means for pivotally mounting said beam, yieldable means including a resilient link interconnecting said pivotal mounting means and said vehicle, a plow pivotally mounted on said beam for angular swinging movement with respect thereto, means attached to said plow and adjustably mounted upon a fixed portion of said vehicle for controlling the angular relation of the plow with respect to the main beam and for causing the plow upon engaging an obstacle to automatically tilt in a direction tending to free the plow from the obstacle and protect the plow against injury, means associated with said resilient link to provide for direct, non-yielding drive of said plow under normal load conditions, said resilient link providing for limited relative movement between said vehicle and plow in response to an abnormal load condition, means for disengaging the clutch of said vehicle in response to yielding movement of said yieldable interconnecting means, and means for retaining said clutch in disengaged position to provide for restoring said yieldable interconnecting means to normal direct driving relation.

5. In a farming implement of the character described, a power driven vehicle, a beam adapted to mount a plow on said vehicle, means for pivotally mounting said beam, yieldable means including a resilient link interconnecting said pivotal mounting means and said vehicle, a plow pivotally mounted on said beam for angular swinging movement with respect thereto, means attached to said plow and adjustably mounted upon a fixed portion of said vehicle for controlling the angular relation of the plow with respect to the main beam and for causing the plow upon engaging an obstacle to automatically tilt in a direction tending to free the plow from the obstacle and protect the plow against injury, means associated with said resilient link to provide for direct, non-yielding drive of said plow under normal load conditions, said resilient link providing for limited relative movement of the vehicle forwardly of the plow in response to an abnormal load condition, means for disengaging the clutch of said vehicle in response to yielding movement of said yieldable interconnecting means, and means for retaining said clutch in disengaged position to provide for clearing the plow of the obstacle, said resilient link providing for return of said vehicle with respect to the plow to thereby automatically restore said yieldable connection to normal direct driving relation and facilitate freeing the plow from the obstacle.

6. In a farming implement of the character described, a power driven vehicle, a shaft extending transversely of the vehicle and provided with an eccentrically mounted crank pin, means rotatably mounting said shaft on said vehicle for movement of said crank pin from a position in advance of said shaft to a position in rear of said shaft, an implement supporting beam pivotally mounted on said crank pin for movement therewith, resilient means for normally retaining said crank pin in said forward position, stop means for limiting the movement of said crank pin under the action of said resilient means to a position such that the axis of said beam is displaced only slightly from the center of said shaft, said resilient means and stop means normally providing a direct driving connection between said vehicle and said beam and providing for relative movement between the vehicle and said beam under the yielding action of said resilient means in response to an abnormal load on said beam.

7. In a farming implement of the character described, a power driven vehicle, a shaft extending transversely of the vehicle and provided with an eccentrically mounted crank pin, means rotatably mounting said shaft on said vehicle for movement of said crank pin from a position in advance of said shaft to a position in rear of said shaft, an implement supporting beam pivotally mounted on said crank pin for movement therewith, resilient means for normally retaining said crank pin in said forward position, stop means for limiting the movement of said crank pin under the action of said resilient means to a position such that the axis of said beam is displaced only slightly from the center of said shaft, said resilient means and stop means providing a direct, non-yielding driving connection between said vehicle and said beam under normal load conditions and providing for rotation of said shaft to cause relative movement between the vehicle and said beam under the yieldable action of said resilient means in response to an abnormal load on said beam, means for disengaging the clutch of said vehicle in response to rotation of said shaft, and means for maintaining said clutch in disengaged position to provide for restoring said direct driving connection between the beam and vehicle under the action of said resilient means.

8. In an implement attachment of the character described, a supporting frame adapted to be attached to a vehicle, an elongated crank shaft rotatably mounted on said frame, a plurality of spaced apart crank pins carried by said crank shaft, an implement supporting beam, means pivotally mounting said beam on said spaced apart crank pins, said crank shaft providing for movement of said crank pins from a position forwardly of the axis of the crank shaft to a position rearwardly of the crank shaft, resilient means for normally retaining said crank pins in said forward position, stop means carried by said crank shaft for limiting the movement of said crank pins under the action of said resilient means, said resilient means and stop means providing a direct, non-yielding connection between said frame and said beam under normal load conditions and providing for rotation of said crank shaft to cause relative movement between said frame and said beam under the yieldable action of said resilient means in response to an abnormal load on said beam, and means for adjusting the positioning of one end of said crank shaft to vary the angularity of the crank shaft relative to said frame.

9. In a ground-working farming implement of the character described, a vehicle, a beam pivotally mounted on said vehicle for free swinging movement in a substantially vertical plane and having a normally free end extending towards the ground and adapted to support a ground-working tool thereon, a plow-like tool pivotally mounted on said free end of said beam for free angular swinging movement with respect to said beam, said plow-like tool being adapted to automatically swing about its pivotal axis on the free end of said beam under reaction to ground forces acting thereon and tending to dig itself further into the ground upon increase in said ground forces, and adjustable control means mounted on a fixed portion of said vehicle and connected to said plow-like tool eccentrically of the pivotal axis thereof and normally free from connection with said beam for controlling angular swinging movement of the tool about its pivotal axis on the end of said beam to adjust the depth of operation and cause the tool to work into and out of the ground.

10. In a ground-working farming implement of the character described, a vehicle, a beam pivotally mounted on said vehicle for free swinging movement in a substantially vertical plane and having a normally free end extending towards the ground and adapted to support a ground-working tool thereon, a plow-like tool pivotally mounted on said free end of said beam for free angular swinging movement with respect to said beam, said plow-like tool being adapted to automatically swing about its pivotal axis on the free end of said beam under reaction to ground forces acting thereon and tending to dig itself further into the ground upon increase in said ground forces, and adjustable control means mounted on a fixed portion of said vehicle and connected to said plow-like tool eccentrically of the pivotal axis thereof and normally free from connection with said beam for controlling angular swinging movement of the tool about its pivotal axis on the end of said beam to adjust the depth of operation and cause the tool to work into and out of the ground, said eccentric connection between said control means and said plow-like tool providing for automatically effecting swinging of the plowing tool about its pivot in accordance with the contour of the ground to cause the tool to remain at substantially the adjusted depth of operation upon changes in the ground contour.

11. In a ground-working farming implement of the character described, a vehicle, a beam pivotally mounted on said vehicle for free swinging movement in a substantially vertical plane and having a normally free end extending towards the ground and adapted to support a ground-working tool thereon, a plow-like tool pivotally mounted on said free end of said beam for free angular swinging movement with respect to said beam, said plow-like tool being adapted to automatically swing about its pivotal axis on the free end of said beam under reaction to ground forces acting thereon and tending to dig itself further into the ground upon increase in said ground forces, and adjustable control means mounted on a fixed portion of said vehicle and connected to said plow-like tool eccentrically of the pivotal axis thereof and normally free from connection with said beam for controlling angular swinging movement of the tool about its pivotal axis on the end of said beam to adjust the depth of operation and cause the tool to work into and out of the ground, said plow-like tool and said beam being unrestrained for free swinging movement upwardly about the pivot axis of said beam upon the tool engaging an abnormal obstruction, and said control means upon said upward swinging movement of the tool providing for automaticaly tilting the tool about its pivot axis in a direction tending to free the tool from the obstruction and protect the tool against injury.

12. In a ground-working farming implement of the character described, a vehicle, a beam pivotally mounted on said vehicle for free swinging movement in a substantially vertical plane and having a normally free end extending towards the ground and adapted to support a ground-working tool thereon, a plow-like tool pivotally mounted on said free end of said beam for free angular swinging movement with respect to said beam, said plow-like tool being adapted to automatically swing about its pivotal axis on the free end of said beam under reaction to ground forces acting thereon and tending to dig itself further into the ground upon increase in said ground forces, and adjustable control means mounted on a fixed portion of said vehicle and connected to said plow-like tool eccentrically of the pivotal axis thereof and normally free from connection with said beam for controlling angular swinging movement of the tool about its pivotal axis on the end of said beam to adjust the depth of operation and cause the tool to work into and out of the ground, said plow-like tool and said beam being unrestrained for free swinging movement upwardly about the pivot axis of said beam upon the tool engaging an abnormal obstruction, and said control means upon said upward swinging movement of the plow-like tool providing for automatically tilting the tool about its pivot axis in a direction tending to facilitate passage of the tool over said obstruction and providing for immediate re-entry of the tool to the adjusted depth of operation within the ground under automatic action of the control means upon passage of the tool over the obstruction.

13. In a ground-working farming implement of the character described, a vehicle, a beam pivotally mounted on said vehicle for free swinging movement in a substantially vertical plane and having a normally free end extending towards the ground and adapted to support a ground-working tool thereon, a plow-like tool pivotally mounted on said free end of said beam for free angular swinging movement with respect to said beam, said plow-like tool being adapted to automatically swing about its pivotal axis on the free end of said beam under reaction to ground forces acting thereon and tending to dig itself further into the ground upon increase in said ground forces, and adjustable control means mounted on a fixed portion of said vehicle and connected to said plow-like tool eccentrically of the pivotal axis thereof and normally free from connection with said beam for controlling angular swinging movement of the tool about its pivotal axis on the end of said beam to adjust the depth of operation and cause the tool to work into and out of the ground, said eccentric connection between said control means and said plow-like tool providing for automatically effecting swinging of the tool about its pivot in accordance with the contour of the ground to cause the tool to remain at substantially the adjusted depth of operation upon changes in the ground contour and under normal load conditions and providing for tilting the tool through a relatively large angle upon the tool engaging an abnormal obstruction to facilitate passage of the tool over the obstruction and effect immediate re-entry of the tool to the adjusted depth of operation within the ground under automatic action of the control means upon passage of the tool over the obstruction.

14. In a ground-working farming implement of the character described, a vehicle, a plow beam pivotally mounted on said vehicle for free swinging movement in a substantially vertical plane and having a normally free end extending towards the ground and adapted to support a ground-working tool thereon, a plow-like tool pivotally mounted on said free end of said beam for free angular swinging movement with respect to said beam, said plow-like tool being adapted to automatically swing about its pivotal axis on the free end of said beam under reaction to ground forces acting thereon and tending to dig itself further into the ground upon increase in said ground forces, a lever connected to said plow-like tool eccentrically of the pivotal axis thereof and independently of said beam for controlling said angular swinging movement of said tool about its pivot axis, adjustable means mounted on a fixed portion of said vehicle and having a pivotal connection with said lever for controlling operation of said lever to adjust the depth of operation of said plow-like tool and cause the tool to dig itself into and out of the ground, said tool and said beam being unrestrained for free swinging movement upwardly about the pivotal axis of said beam upon the tool engaging an abnormal obstruction, said lever being adapted to turn about said pivotal connection with the adjusting means upon said upward movement of the tool and said eccentric connection providing for swinging the tool about its pivotal axis to tilt the toe of the tool downwardly, and said pivotal connection between said lever and said adjustable means being positioned above the pivotal axis of said plow-like tool and intermediate said pivotal axis and the pivotal axis of said beam to provide for swinging the tool through a relatively large angle upon said upward movement thereof.

15. In a ground-working farming implement of the character described, a vehicle, a plow beam pivotally mounted on said vehicle for free swinging movement in a substantially vertical plane and having a normally free end extending towards the ground and adapted to support a ground-working tool thereon, a plow-like tool pivotally mounted on said free end of said beam for free angular swinging movement with respect to said beam, said plow-like tool being adapted to automatically swing about its pivotal axis on the free end of said beam under reaction to ground forces acting thereon and tending to dig itself further into the ground upon increase in said ground forces, a control lever adjustably mounted on a fixed portion of said vehicle, means connected to said plow-like tool and to said control lever and normally free from connection with said beam for effecting angular swinging movement of said tool about its pivot axis upon adjustment of said control lever to control the operation of the tool, and means included in said connecting means for raising said beam and said plow-like tool to a clearance position above the ground upon predetermined adjustment of said lever.

16. A ground plowing implement of the character described comprising a vehicle, a drag beam pivotally mounted on said vehicle for free swinging movement in a substantially vertical plane and having a normally free end extending towards the ground and adapted to support a plowing tool thereon, a plowing tool pivotally mounted on said free end of said drag beam for angular swinging movement with respect to the beam, said plowing tool being adapted to automatically swing about its pivotal axis on the free end of said beam under reaction to ground forces acting thereon and tending to dig itself further into the ground upon increase in said ground forces, an auxiliary beam rigidly attached to said plowing tool in rear of the pivotal axis thereof and extending forwardly towards the pivot axis of said drag beam above the pivotal axis of said plowing tool, adjusting means mounted on a fixed portion of said vehicle for effecting adjustment of said auxiliary beam to control said angular swinging movement of said plowing tool about its pivotal axis, and means providing a pivotal connection between said adjusting means and said lever at a position intermediate the pivotal axis of said beam and the pivotal axis of said plowing tool.

17. A farm implement as defined in claim 16 in which the turning radius of said auxiliary beam about its pivotal connection with said adjusting means is substantially less than the turning radius of said drag beam about its pivot axis, and means is provided for effecting raising of said drag beam and the plowing tool to a clearance position above the ground under control of said adjusting means.

MELVIN C. CHANEY.